(12) United States Patent
Magness

(10) Patent No.: US 8,557,946 B1
(45) Date of Patent: Oct. 15, 2013

(54) OXIDATION DISCOLORATION RESISTANT POLYURETHANE FOAM

(75) Inventor: Scott Christopher Magness, Belcamp, MD (US)

(73) Assignee: Wm. T. Burnett IP, LLC, Baltimore, MD (US)

( * ) Notice: Subject to any disclaimer, the term of this patent is extended or adjusted under 35 U.S.C. 154(b) by 52 days.

(21) Appl. No.: 13/036,654

(22) Filed: Feb. 28, 2011

(51) Int. Cl.
| | |
|---|---|
| *C08G 18/08* | (2006.01) |
| *C08G 18/16* | (2006.01) |
| *C08G 18/38* | (2006.01) |
| *C09K 21/00* | (2006.01) |
| *C08J 9/00* | (2006.01) |

(52) U.S. Cl.
USPC ............. 528/51; 252/601; 252/609; 521/106; 521/107

(58) Field of Classification Search
USPC .............. 252/601, 609; 521/106, 107; 528/51
See application file for complete search history.

(56) References Cited

U.S. PATENT DOCUMENTS

| | | | | | |
|---|---|---|---|---|---|
| 3,009,939 | A | * | 11/1961 | Friedman | 558/186 |
| 3,142,650 | A | * | 7/1964 | Friedman | 521/169 |
| 3,483,147 | A | * | 12/1969 | Friedman | 521/169 |
| 3,684,754 | A | * | 8/1972 | Barie et al. | 521/157 |
| 4,067,832 | A | | 1/1978 | DesMarais | |
| 4,135,042 | A | * | 1/1979 | Lickei et al. | 521/107 |
| 4,150,206 | A | | 4/1979 | Jourquin et al. | |
| 4,607,062 | A | | 8/1986 | Megna | |
| 4,616,044 | A | * | 10/1986 | Fesman | 521/107 |
| 4,652,485 | A | * | 3/1987 | Fesman | 442/142 |
| 4,654,105 | A | * | 3/1987 | Fesman | 156/308.2 |
| 5,248,713 | A | * | 9/1993 | Lunk et al. | 524/120 |
| 5,268,393 | A | * | 12/1993 | Blount | 521/85 |
| 5,405,610 | A | * | 4/1995 | Rei et al. | 424/405 |
| 5,420,167 | A | * | 5/1995 | Fishback et al. | 521/168 |
| 5,571,453 | A | | 11/1996 | Barry et al. | |
| 5,648,412 | A | * | 7/1997 | Mistry et al. | 524/189 |
| 5,811,470 | A | * | 9/1998 | Prindle et al. | 521/85 |
| 6,103,851 | A | * | 8/2000 | Roser et al. | 528/77 |
| 6,319,962 | B1 | * | 11/2001 | Singh et al. | 521/170 |
| 6,676,849 | B2 | | 1/2004 | DeMassa | |
| 6,852,776 | B2 | | 2/2005 | Ong et al. | |
| 2004/0183054 | A1 | * | 9/2004 | Stevenson et al. | 252/400.24 |
| 2005/0009939 | A1 | * | 1/2005 | Zhao et al. | 521/106 |
| 2006/0160977 | A1 | | 7/2006 | Ou | |
| 2006/0247376 | A1 | | 11/2006 | Hasegawa et al. | |
| 2006/0270807 | A1 | * | 11/2006 | Zhu et al. | 525/453 |
| 2007/0208097 | A1 | | 9/2007 | Zhao et al. | |
| 2008/0105856 | A1 | | 5/2008 | DebRoy et al. | |
| 2010/0048782 | A1 | * | 2/2010 | Gelbin et al. | 524/147 |
| 2011/0028619 | A1 | * | 2/2011 | Hill et al. | 524/153 |
| 2011/0230604 | A1 | * | 9/2011 | Mader et al. | 524/101 |

OTHER PUBLICATIONS

Tartarini, Cinzia, K. Schrinner, Polyol Additives Impact on Flexible Foam Properties, Ciba Inc.
No Known Author, Additives for Polyurethane, Enhanced Processing and Service Life for Polyurethane Products, Ciba Inc.

\* cited by examiner

*Primary Examiner* — Melissa Rioja
(74) *Attorney, Agent, or Firm* — Plumsea Law Group, LLC

(57) ABSTRACT

A flexible polyurethane foam with improved resistance to discoloration from oxidation is disclosed. Such discoloration may be due to exposure to oxides of nitrogen, for example, the oxides commonly found in burnt gas fumes. The foam may be used for applications such as intimate apparel and other consumer products that need extended term color stability. The foam composition includes high levels of reactive and non-reactive phosphite esters that improve color stability without disadvantage to the foam's physical and aesthetic properties during and after production.

33 Claims, No Drawings

OXIDATION DISCOLORATION RESISTANT POLYURETHANE FOAM

BACKGROUND

The present disclosure relates generally to polyurethane foams that are resistant to discoloration. In particular, the present disclosure relates to flexible polyurethane foams with improved resistance to discoloration from oxidation, such as oxidation due to exposure to oxides of nitrogen in burnt gas fumes.

Polyurethane foams and methods for manufacturing such foams are well known. Fundamentally, a polyurethane foam is manufactured from polyisocyanate, surfactant, and polyol. In addition, manufacturing usually requires a catalyst, typically comprising a tertiary amine component and/or an organo-tin component, and a blowing agent. Additional components such as, but not limited to, fillers, pigments/dyes, flame retardants, biocides, and/or antistatic agents are also frequently added depending on the desired end-use of an article that incorporates the foam. Different combinations of polyol, polyisocyanate, and surfactant tend to give different properties to the resultant polyurethane foam. Polyurethane foams may vary from being flexible to semi-rigid to rigid, having open cell structures to relatively closed cell structures, porous to non-porous, and may have a wide range of other physical properties, depending on the requirements of the end-user.

Polyurethane foam generally exhibits a high propensity to discolor during manufacture and storage due to numerous factors, including oxidation discoloration from exposure to oxides of nitrogen. Oxides of nitrogen that readily attack polyurethane foam to cause discoloration are often created through gas engine combustion. Such engines are often prevalent in the manufacturing environment, as well as in the general environment.

The manufacture of an aesthetically acceptable polyurethane foam that also prevents discoloration from oxides of nitrogen and other sources (e.g. UV light exposure, phenolic yellowing) has proven difficult, no matter what methods or compositions have been employed. For example, the use of aliphatic isocyanates has been known to allow the creation of polyurethane foam with significantly reduced or no discoloration upon exposure to ultraviolet light. U.S. Pat. No. 4,067,832 to DesMarais provides an example of such foams, the disclosure of which is hereby incorporated by reference in its entirety. However, aliphatic isocyanate-based foams are difficult to process and reproduce with consistent physical and aesthetic properties.

Due to the lower reactivity of aliphatic isocyanate compared to standard aromatic isocyanates, prior attempts to use aliphatic isocyanate have included the use of heavy metal catalysts (such as lead) to provide the catalysis necessary to make these foams. See, for example, U.S. Pat. No. 4,150,206 to Jourquin et al. and U.S. Pat. No. 4,607,062 to Megna, the disclosures of which are hereby incorporated by reference in their entireties. Such efforts have not been successful for a variety of reasons, including the safety concerns of end-products potentially containing these heavy metal compounds. In addition, aliphatic isocyanate-based foams are problematic due to their significantly increased costs compared with foams made with standard isocyanates, such as aromatic isocyanates.

One aliphatic isocyanate for use in polyurethane foams is supplied by Recticel of Evere, Belgium, under the trade name Bulfast®. This isocyanate is marketed for applications that require articles to have a discoloration resistance to ultraviolet light. However, these foams generally still discolor unacceptably when exposed to other sources of discoloration, such as oxides of nitrogen. Furthermore, these and other aliphatic isocyanate-based foams are known to exhibit poor or commercially unacceptable hydrolytic stability, resulting in the loss of any physical form when the foams are exposed to high temperatures and humidity for prolonged periods of time.

The polyurethane industry has also examined the use of various stabilizers and/or antioxidants to overcome persistent discoloration problems. However, stabilizers and/or antioxidants are not a cure-all to the problems associated with polyurethane foam discoloration. Stabilizers and/or antioxidants often pose problems in making foam easy to process. For example, the incorrect type or incorrect quantity of additives will prevent polyurethane foam from possessing and displaying industry-acceptable physical and aesthetic properties.

Therefore, there exists a need in the art for a combination of additives to be used in a standard polyurethane foam system (i.e., made from aromatic isocyanates) to produce foam resistant to discoloration from oxides of nitrogen.

SUMMARY

Generally, this disclosure provides for polyurethane foam created from a system that includes stabilizers that improve the discoloration resistance to oxides of nitrogen while still maintaining physical and aesthetic properties desirable for commercial acceptance. The system may also allow foam to be created within a large range of physical properties, facilitating customization for consumer applications based on the desired end-use of an article.

In one aspect, a polyurethane foam may be produced from a formulation comprising: a polyol; an isocyanate; a blowing agent; a first phosphite ester, the first phosphite ester being reactive with at least one of the polyol and the isocyanate; and a second phosphite ester, the second phosphite ester being substantially non-reactive with each of the polyol, the isocyanate, and the first phosphite ester; wherein the polyurethane foam is resistant to discoloration from oxides and resistant to scorch.

In another aspect, the polyurethane foam as described above may be produced wherein the isocyanate comprises an aromatic group.

In another aspect, the polyurethane foam as described above may be produced wherein the polyol comprises a polyether.

In another aspect, the polyurethane foam as described above may be produced wherein the first phosphite ester comprises at least one instance of a functional group selected from the group consisting of a hydroxyl, an amino, a carboxyl, a thiol, and an amido.

In another aspect, the polyurethane foam as described above may be produced wherein the first phosphite ester comprises at least one instance of a hydroxyl functional group.

In another aspect, the polyurethane foam as described above may be produced wherein the first phosphite ester comprises tris(dipropyleneglycol)phosphite.

In another aspect, the polyurethane foam as described above may be produced wherein the second phosphite ester comprises an aryl-alkyl compound.

In another aspect, the polyurethane foam as described above may be produced wherein the second phosphite ester comprises poly(dipropyleneglycol)phenyl phosphite.

In another aspect, the polyurethane foam as described above may be produced wherein the total weight percentage of the first phosphite ester and the second phosphite ester combined is at least about 10%.

In another aspect, the polyurethane foam as described above may be produced wherein the total weight percentage of the first phosphite ester and the second phosphite ester combined is at least about 15%.

In another aspect, the polyurethane foam as described above may be produced wherein the total weight percentage of the first phosphite ester and the second phosphite ester combined is within a range of about 0.1% to about 15%.

In another aspect, the polyurethane foam as described above may be produced wherein the first phosphite ester comprises at least about 5% by weight of the formulation, and the second phosphite ester comprises at least about 5% by weight of the formulation.

In another aspect, the polyurethane foam as described above may be produced wherein the second phosphite ester comprises at least about 10% by weight of the formulation.

In another aspect, the polyurethane foam as described above may be produced wherein the foam is sufficiently open cell so as to have an air permeability of at least 0.5 cfm.

In another aspect, the polyurethane foam as described above may be produced wherein the foam is sufficiently open cell so as to have an air permeability of at least 1.0 cfm.

In another aspect, the polyurethane foam as described above may be produced wherein the foam is sufficiently open cell so as to have an air permeability of about 1.5 cfm.

In another aspect, the polyurethane foam as described above may be produced wherein the foam is resistant to discoloration from oxides so as to measure at least 3 on a grey scale as defined by ISO 105-A03 when tested for discoloration in accordance with AATCC 23-2005.

In another aspect, the polyurethane foam as described above may be produced wherein the foam is resistant to discoloration from oxides so as to measure at least 4 on a grey scale as defined by ISO 105-A03 when tested for discoloration in accordance with AATCC 23-2005.

In another aspect, the polyurethane foam as described above may be produced wherein the foam is resistant to scorch so as to measure at least 3.5 on a grey scale as defined by ISO 105-A03 when tested for scorch resistance in a microwave scorch test.

In another aspect, the polyurethane foam as described above may be produced wherein the foam has a density within a range of about 1.20 to about 3.50 pounds per cubic foot.

In another aspect, the polyurethane foam as described above may be produced wherein the foam has a tensile strength within a range of about 15.00 to about 30.00 pounds per square inch.

In another aspect, the polyurethane foam as described above may be produced wherein the foam has a percentage elongation at break within a range of about 150% to about 300%.

In another aspect, the polyurethane foam as described above may be produced wherein the foam has a tear strength within a range of from about 1.50 to about 4.00 pounds per inch.

In another aspect, the polyurethane foam as described above may be produced wherein the foam has a compression force deflection within a range of about 0.25 to about 0.75 pounds per square inch at a 25% deflection.

In another aspect, the polyurethane foam as described above may be produced wherein the foam has a compression set of less than about 10.00% when compressed by 50%.

In another aspect, the polyurethane foam as described above may be produced wherein the formulation further comprises a surfactant and a catalyst.

In a second aspect, a polyurethane foam may be produced from a formulation comprising: a polyether polyol; an aromatic diisocyanate; a blowing agent; about 5% by weight tris(dipropyleneglycol)phosphite; and about 10% by weight poly(dipropyleneglycol)phenyl phosphite; wherein the foam is sufficiently open cell so as to have an air permeability of about 1.5 cfm, the foam is resistant to discoloration from oxides, and the foam is resistant to scorch.

In a third aspect, a polyurethane composition may be produced from a formulation comprising a polyol; an isocyanate; a first phosphite ester, the first phosphite ester being reactive with at least one of the polyol and the isocyanate; and a second phosphite ester, the second phosphite ester being substantially non-reactive with each of the polyol, the isocyanate, and the first phosphite ester; wherein the polyurethane composition is resistant to discoloration from oxides and resistant to scorch.

In another aspect, the polyurethane composition as described above may be produced wherein the isocyanate comprises an aromatic group.

In another aspect, the polyurethane composition as described above may be produced wherein the isocyanate comprises toluene diisocyanate.

In another aspect, the polyurethane composition as described above may be produced wherein the polyol comprises a polyether.

In another aspect, the polyurethane composition as described above may be produced wherein the first phosphite ester comprises at least one instance of a functional group selected from the group consisting of a hydroxyl, an amino, a carboxyl, a thiol, and an amido.

In another aspect, the polyurethane composition as described above may be produced wherein the first phosphite ester comprises at least one instance of a hydroxyl functional group.

In another aspect, the polyurethane composition as described above may be produced wherein the first phosphite ester comprises tris(dipropyleneglycol)phosphite.

In another aspect, the polyurethane composition as described above may be produced wherein the second phosphite ester comprises an aryl-alkyl compound.

In another aspect, the polyurethane composition as described above may be produced wherein the second phosphite ester comprises poly(dipropyleneglycol)phenyl phosphite.

In another aspect, the polyurethane composition as described above may be produced wherein the total weight percentage of the first phosphite ester and the second phosphite ester is at least about 15%.

In another aspect, the polyurethane composition as described above may be produced wherein the polyurethane composition is a foam.

Other systems, methods, features and advantages of the invention will be, or will become, apparent to one of ordinary skill in the art upon examination of the detailed description. It is intended that all such additional systems, methods, features and advantages be included within this description and this summary, be within the scope of the invention, and be protected by the claims.

DETAILED DESCRIPTION

The present disclosure relates to a stabilizer composition for flexible polyurethane foam that improves resistance to discoloration from oxidation due to exposure to oxides of nitrogen. This stabilizer composition may include a reactive phosphite ester and a non-reactive phosphite ester in combination. This particular combination may allow polyurethane foam to maintain acceptable physical and aesthetic properties during and after production.

Generally, the polyurethane foam that is the subject of this disclosure may be made from any type of polyurethane system. A variety of commonly used components for polyurethane foams is known in the art, and may generally include any polyol, any polyisocyanate, and any additives.

In particular, the choice of polyol used to form the polyurethane foam can affect the physical and chemical properties of the foam. For example, the polyol may be a polyester. Polyester-based polyurethane foams are known within the industry to have better discoloration resistance, specifically resistance to discoloration from ultraviolet light and oxides of nitrogen, than foams made with polyether polyol. In other embodiments, the polyol may be a polyether. The polyether polyol may be a conventional polyether or a copolymer polyether polyol.

A wide range of polyisocyanates may be used to prepare the polyurethane foam. For example, the polyisocyanate may be toluene diisocyanate (TDI), polymethylenepolyphenylene polyisocyanate (MDI), hexamethylene diisocyanate (HMDI), isophorone diisocyanate (IPDI), and mixtures thereof. In particular embodiments, toluene diisocyanate (TDI) may be used. Generally, the polyisocyanate may be either an aliphatic isocyanate or an aromatic isocyanate, or combinations thereof. As noted above, the use of aliphatic isocyanates may affect the discoloration resistance as well as the physical and aesthetic properties of the resulting foam. Therefore, in certain embodiments, aromatic isocyanates may be used in particular.

When toluene diisocyanate is used as the polyisocyanate, the toluene diisocyanate is typically added at a TDI index (i.e., the ratio of TDI actually used to the theoretical stoichiometric amount of TDI) of from about 75 to about 125. In certain embodiments, a TDI index between 100 and 110 may be used. The isocyanate index for specific polyisocyanates other than TDI may be optimized according to well know principles used in the polyurethane industry. The toluene diisocyanate, or other polyisocyanate, may also be used at various isomer ratios (e.g., a mixture of 2,4 TDI and 2,6 TDI). In particular embodiments, polyurethane foams created from an excess of the isomer 2,6-toluene diisocyanate may tend to be more open cell.

Polyurethane foams in accordance with this disclosure may also include any of a variety of additives commonly used in the foam industry, in addition to the stabilizer composition that is the particular subject of this disclosure. Such additives may include surfactants, catalysts, blowing agents, and antioxidants.

The function and use of surfactants in polyurethane foams is well known. Surfactants employed in the preparation of polyurethane foams are generally polysiloxanes/polyalkylene oxide copolymers, and are available from several known manufacturers. Surfactants generally help to control the precise timing and the degree of cell-opening. Within each foam formulation, a minimum level of surfactant may be needed in order to produce commercially acceptable foam. In the absence of a surfactant, a foaming system may experience catastrophic coalescence and exhibit an event known as boiling. However, with the addition of a small amount of surfactant, stable yet imperfect foams may be produced. With increasing surfactant concentration, a foam system may show improved stability and cell-size control. At optimum concentrations of the surfactant, stable open-cell foams may be produced.

Tertiary amines and organo-tin compounds may be used as catalysts to make the polyurethane foam. Examples of suitable tertiary amines may include, but are not limited to: triethylenediamine, triethylamine, N-methyhnorpholine, N-ethylmorpholine, bis(dimethylaminoethyl)ether, and N,N, N'N'-tetramethylbutanediamine. Suitable organo-tin catalysts may include, but are not limited to, stannous octoate and dibutyltin dilaurate, which may be used to stabilize the foam and generally have little to no negative impact on the discoloration of polyurethane foam.

Examples of blowing agents that may be included in the polyurethane foam include water, liquid carbon dioxide, and acetone. In particular embodiments, the blowing agent may be water specifically.

A common and often vexing manufacturing problem with polyurethane foam is the development of overheated or "scorched" foam. Scorch is caused by thermal degradation during exothermic production and/or at the point of molding of the foam in preparation for its end use. Scorch is often mitigated through the use of antioxidants present within the polyol. Conventional antioxidant packages are normally included in polyols to help mitigate issues with scorch and are composed of a hindered phenol and/or secondary aromatic amine. Antioxidants may be added to the polyurethane foam system in amounts ranging from about 0% to about 1.5% by weight, for example.

One aspect of the foam provides a stabilizer composition having increased resistance to discoloration due to oxidation. The stabilizer composition may include a reactive phosphite ester and a non-reactive phosphite ester in combination.

The reactive phosphite ester may generally be any phosphite ester that includes a functional group capable of reacting with one or more other components of the polyurethane foam system. In particular embodiments, the reactive phosphite ester may be reactive with at least one of the polyol and the isocyanate in the polyurethane foam system. Such functional groups may include a hydroxyl, an amino, a carboxyl, a thiol, and an amido, for example. The reactive phosphite ester may include multiple instances of each such functional group, and may include more than one type of functional group.

Generally, the use of a reactive phosphorous material is known to enhance color stability in foams exposed to oxides of nitrogen. Reactive phosphite esters containing hydroxyl groups, such as Niax CS-22, also known as tris(dipropyleneglycol)phosphite, are marketed to be used at certain prescribed levels, i.e., 0.5 to 2.0 pphp and up to 5.0 pphp in certain foams. Other reactive phosphate esters are disclosed in U.S. Patent Application Publication No. 2007/0208097 to Zhao et al., the disclosure of which is herein incorporated by reference in its entirety.

However, the ability to make polyurethane foam in a consistent fashion with higher levels of reactive phosphite ester is difficult due to phosphorous' relatively low molecular weight and the reactive phosphite's contributions to causing poor production processing. In addition, polyurethane foam made with higher levels of reactive phosphite (i.e., greater than 5.0 pphp) generally display a higher degree of closed cell structure and thermal instability during production, resulting in discoloration due to scorch. Moreover, foams made with these higher levels of the reactive phosphite ester generally do not display the acceptable discoloration resistance to oxides of nitrogen necessary to achieve a minimum discoloration of Class 3 based on the ISO 105-A03 Grey Scale.

The conventional solution to the above-mentioned problems with high loading levels of reactive phosphite may be to decrease the overall amount of phosphorous material added to the foam composition. However, in the present disclosure, the above-mentioned obstacles may instead be overcome by increasing the overall levels of phosphite esters present by adding selective non-reactive phosphite esters to the foam mixture in addition to the reactive phosphite esters.

A non-reactive phosphite ester may generally be any phosphite ester that does not react with another component of the polyurethane system. Specifically, the non-reactive phosphite ester may be substantially non-reactive with each of the polyol, the isocyanate, and the reactive phosphite ester. In other words, the non-reactive phosphite ester may be incapable of forming a chemical bond with any of these components of the polyurethane system.

Non-reactive phosphites have been used and studied in polyurethane foam in an effort to prevent scorch and/or oxidation, which results in thermal degradation of the foam. It is known that non-reactive phosphites can act as secondary antioxidants that function as peroxide scavengers to help mitigate the cycle oxidation that leads to thermal degradation. However, the use of levels of non-reactive phosphite esters in previously known polyurethane foams has been limited to only small amounts, generally no more than 1.0% of the final foam composition, for these purposes. In contrast, the present disclosure provides for use of non-reactive phosphites in much larger amounts. For example, reactive phosphites may be added to polyurethane foam systems in amounts of up to 10.0 pphp.

The non-reactive phosphite ester may include a variety of different substituent groups, including aryl, alkyl, and arylalkyl phosphites. The following non-reactive phosphite esters are examples that may be used in polyurethane foams in accordance with this disclosure: (1) aryl phosphite esters such as tris(nonylphenyl)phosphite, having trade name Weston® TNPP; (2) alkyl phosphite esters such as triisodecyl phosphite, having trade name Weston® TDP; and aryl-alkyl phosphite esters such as (3) phenyl diisodecyl phosphite having trade name Weston® PDDP, (4) diphenyl isodecyl phosphite having trade name Weston® DPDP and (5) poly(dipropyleneglycol)phenyl phosphite having trade name Weston® DHOP.

These non-reactive phosphite esters may be combined with reactive phosphites to improve color stability in the presence of oxides of nitrogen, without impacting the processing and/or thermal stability of the polyurethane foam, as shown in the following examples.

EXAMPLES

The invention can be further described with reference to the following examples. The term "pphp" used in the examples refers to parts per hundred polyol by weight.

In the examples, the following materials were examined:

Polyol #1: Bayer Arcol® F-3022; polyether polyol; 3,000-molecular weight; hydroxyl number 56 mg KOH/g.

Polyol #2: Bayer Arcol® UHS-150; polyether polymer polyol; hydroxyl number 25.5±2 mg KOH/g.

Isocyanate #1: Bayer Mondur® TD-80; monomeric toluene diisocyanate (TDI); 80/20 mixture of the 2,4 and 2,6 isomer; NCO weight 48%; equivalent weight 87.5; functionality 2.

Isocyanate #2: Bayer Mondur® TD-65; monomeric toluene diisocyanate (TDI); 65/35 mixture of 2,4 and 2,6 TDI; NCO weight 48%; equivalent weight 87.5; functionality 2.

Surfactant: Momentive Niax L-620™ silicone surfactant.

Tertiary Amine: Air Products Dabco BLV®; 3:1 blend of DABCO 33-LV® and DABCO BL-11® catalysts.

Metal Catalyst: Air Products Dabco T-9®; Stannous Octoate.

Blowing Agent: Water.

Reactive Phosphite Ester #1: Momentive Niax CS-22™, Tris(Dipropyleneglycol)Phosphite.

Non-Reactive Phosphite Ester #1: Weston® TNPP, Tris (nonylphenyl)phosphite.

Non-Reactive Phosphite Ester #2: Weston® TDP, Triisodecyl Phosphite.

Non-Reactive Phosphite Ester #3: Weston® PDDP, Phenyl Diisodecyl Phosphite.

Non-Reactive Phosphite Ester #4: Weston® DPDP, Diphenyl Isodecyl Phosphite.

Non-Reactive Phosphite Ester #5: Weston® DHOP, Poly (dipropyleneglycol)phenyl phosphite.

The above-listed components were variously combined into polyurethane foam systems in the amounts shown in Table 1.

TABLE 1

| | Example #: | | | | | | | | | | | | | |
|---|---|---|---|---|---|---|---|---|---|---|---|---|---|---|
| | #1 | #2 | #3 | #4 | #5 | #6 | #7 | #8 | #9 | #10 | #11 | #12 | #13 | #14 |
| Polyol #1 | 100 | 65 | 62.5 | 60 | 55 | 55 | 50 | 60 | 60 | 60 | 60 | 60 | 60 | 60 |
| Polyol #2 | 0 | 35 | 35 | 35 | 35 | 35 | 35 | 35 | 35 | 35 | 35 | 35 | 35 | 35 |
| Isocyanate #1 | 44.62 | 42.9 | 44.2 | 45.6 | 48.4 | 24.2 | | 45.6 | 45.6 | 45.6 | 45.6 | 45.6 | 45.6 | 45.6 |
| Isocyanate #2 | 0 | 0 | 0 | 0 | 0 | 24.2 | 48.4 | 0 | 0 | 0 | 0 | 0 | 0 | 0 |
| Surfactant | 1 | 1 | 1 | 1 | 1 | 1 | 1 | 1 | 1 | 1 | 1 | 1 | 1 | 1 |
| Tertiary Amine | 0.25 | 0.25 | 0.25 | 0.25 | 0.25 | 0.25 | 0.25 | 0.25 | 0.25 | 0.25 | 0.25 | 0.25 | 0.25 | 0.25 |
| Metal Catalyst | 0.25 | 0.25 | 0.25 | 0.25 | 0.25 | 0.25 | 0.25 | 0.25 | 0.25 | 0.25 | 0.25 | 0.25 | 0.25 | 0.25 |
| Blowing Agent | 3.5 | 3.5 | 3.5 | 3.5 | 3.5 | 3.5 | 3.5 | 3.5 | 3.5 | 3.5 | 3.5 | 3.5 | 3.5 | 3.5 |
| Reactive Phosphite #1 | 0 | 0 | 2.5 | 5 | 10 | 10 | 15 | 5 | 5 | 5 | 5 | 5 | 5 | 5 |
| Non-Reactive Phosphite #1 | 0 | 0 | 0 | 0 | 0 | 0 | 0 | 5 | 0 | 0 | 0 | 0 | 0 | 0 |
| Non-Reactive Phosphite #2 | 0 | 0 | 0 | 0 | 0 | 0 | 0 | 0 | 5 | 0 | 0 | 0 | 10 | 0 |
| Non-Reactive Phosphite #3 | 0 | 0 | 0 | 0 | 0 | 0 | 0 | 0 | 0 | 5 | 0 | 0 | 0 | 0 |
| Non-Reactive Phosphite #4 | 0 | 0 | 0 | 0 | 0 | 0 | 0 | 0 | 0 | 0 | 5 | 0 | 0 | 0 |
| Non-Reactive Phosphite #5 | 0 | 0 | 0 | 0 | 0 | 0 | 0 | 0 | 0 | 0 | 0 | 5 | 0 | 10 |

Each polyurethane foam example was tested for physical properties and discoloration resistance against an appropriate industry standard, as described below. Further testing was done based on the common end-use of products incorporating the invention, as also described below.

The physical properties of the examples were tested in accordance with ASTM D3574, which is herein incorporated by reference in its entirety, and include: density (pounds per cubic foot), air permeability (cubic feet per minute), tensile strength (pounds per square inch), elongation (percentage), tear strength (pounds per linear inch), compression force deflection at 25%, compression recovery at 50%, and steam autoclave aging via J2 Test and percent loss of Tensile Strength.

Discoloration testing was conducted in accordance with the designated test methods of AATCC 23-2005, "Colorfastness to Burnt Gas Fumes," which is herein incorporated by reference in its entirety. A discoloration from scorch grade was assigned after examining the inner core of buns and/or blocks where the greatest thermal instability exists. Microwave scorch testing was performed in accordance with the methods described in U.S. Pat. No. 4,131,660 to Jacobs, the disclosure of which is herein incorporated by reference in its entirety. Results were rated using the aforementioned ISO 105-A03 Grey Scale Test, of which is herein incorporated by reference in its entirety. This scale assesses a rating of 5 for no staining and a 1 for a complete staining, with half steps included in the scale as noted.

Testing was conducted to reflect the recognized standards for polyurethane foam appearance and performance within the intimate apparel and other consumer product markets. Desired aesthetic properties for consumer applications include a fine uniform cell structure, an absence of pinholes, and materials that do not indent and/or wrinkle after folding and compression. The examples are marked with a "P" if they hold these aesthetic properties and an "F" if they did not display all of these properties.

In addition, polyurethane foam samples from the examples were exposed for ninety seconds to a 205° C. molding press and were analyzed for thermoformable shape, a property desired specifically in the intimate apparel industry for cups and padding. Examples that did not thermoform were given a rating of a 1 and those that thermoformed completely were given a rating of 5. Finally, owing to certain markets that require foam to flame laminate to a textile material to create a bonded fabric, a rating was assigned to each of the examples for the bond strength exhibited between a fabric and the foams of the invention. A rating of 1 indicates a poor bond strength, while a rating of 5 indicates an excellent bond strength.

The results of these tests are shown in Table 2.

TABLE 2

| | Example #: | | | | | | | | | | | | | |
|---|---|---|---|---|---|---|---|---|---|---|---|---|---|---|
| | #1 | #2 | #3 | #4 | #5 | #6 | #7 | #8 | #9 | #10 | #11 | #12 | #13 | #14 |
| Density (pcf) | 1.83 | 1.85 | 1.81 | 1.83 | 1.87 | 1.78 | 1.85 | 1.83 | 1.85 | 1.84 | 1.87 | 1.81 | 1.93 | 1.91 |
| Air Permeability (cfm) | 4.33 | 4.55 | 2.8 | 1.3 | 0.38 | 1.45 | 0.25 | 1.3 | 1.41 | 1.37 | 1.45 | 1.28 | 1.5 | 1.48 |
| Tensile Strength (psi) | 18.38 | 18 | 18.2 | 17.2 | 17.2 | 17.8 | 15.1 | 18.2 | 18.2 | 18.5 | 18.6 | 18 | 17.1 | 17.3 |
| Elongation at break (%) | 185 | 178 | 190 | 172 | 168 | 162 | 148 | 183 | 188 | 195 | 180 | 190 | 180 | 180 |
| Tear Strength (pli) | 2.12 | 2.48 | 2.14 | 2.35 | 2.11 | 2.23 | 1.91 | 2.15 | 2.28 | 2.41 | 2.14 | 2.2 | 2.01 | 2.19 |
| CFD 25% (psi)) | 0.35 | 0.65 | 0.63 | 0.68 | 0.66 | 0.7 | 0.68 | 0.65 | 0.61 | 0.66 | 0.62 | 0.65 | 0.62 | 0.64 |
| Compression Set 50% | 3 | 7.43 | 7.58 | 7.5 | 8.13 | 7.13 | 8.45 | 6.18 | 4.6 | 7.01 | 5.48 | 4.58 | 7.89 | 7.31 |
| Steam Autoclave Aging | 4.83 | 5.35 | 6.84 | 7.18 | 6.58 | 7.4 | 9.14 | 5.52 | 5.82 | 6.43 | 7.13 | 5.98 | 7.91 | 9.08 |
| Burnt Gas Fumes | 1 | 1 | 1.5 | 2 | 2.5 | 2.5 | 3 | 2 | 2.5 | 2 | 2 | 2.5 | 3 | 3 |
| Scorch Discoloration | 5 | 5 | 5 | 4.5 | 3.5 | 3.5 | 2 | 4.5 | 4.5 | 4.5 | 4.5 | 4.5 | 4.0 | 4.5 |
| Aesthetic Quality | P | P | P | P | F | P | F | P | P | P | P | P | F | P |
| Thermoformable | 2 | 3.5 | 4 | 4 | 4.5 | 4 | 4.5 | 4 | 4 | 4 | 4 | 4 | 4 | 4 |
| Flame Lamination Bond Strength | 1 | 1 | 2 | 2.5 | 3 | 3 | 3 | 2.5 | 2.5 | 2.5 | 2.5 | 2.5 | 2.5 | 2.5 |

The results indicate that by including the combination of phosphite esters as disclosed, polyurethane foam can be made to meet accepted industry standards of discoloration resistance to oxides of nitrogen, while maintaining aesthetic and physical properties desired in consumer products that incorporate these foams.

In particular, example #14 shows that non-reactive phosphite ester Weston® DHOP may achieve a higher usage level without impacting the physical and aesthetic foam property consistency. This was unexpected for a variety of reasons, among which include the fact that other aryl-alkyl phosphite esters showed dissimilar results and the fact that Western® DHOP is marketed solely for PVC applications and not for polyurethanes. Nevertheless, polyurethane foams made with Weston® DHOP displayed more uniform physical properties, a finer, more uniform open cell structure, greater thermal stability during production, and minimized discoloration.

Without wishing to be bound by any particular theory of action, one hypothetical explanation for these surprising results from such similar chemicals is Weston® DHOP's inclusion of numerous dipropylene glycol units, which may process more favorably with polyurethane. In contrast, for example, Weston® TDP includes large hydrocarbons, which may adversely impact the physical and aesthetic properties of polyurethane foam.

Thus, an unexpected combination of a reactive and non-reactive phosphite ester in relatively large levels is preferred to create polyurethane foam with consistent physical properties, acceptable thermal stability, and satisfactory color stability testing. The inclusion of the hydroxyl reactive phosphite allows the polyurethane foam to be thermoformed more easily in molding applications. It also enables the foam to be flame laminable to textiles owing to the increased bond strength between the foam and textile, a necessity in certain product markets. In a particular embodiment, at least 15.00 pphp of the aforementioned combination of phosphite esters is included in the polyurethane foam system. In particular embodiments, the ratios of these phosphite esters is 5.00 pphp of tris(dipropyleneglycol)phosphite ester and 10.00 pphp of poly(dipropyleneglycol)phenyl phosphate.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A polyurethane foam produced from a formulation comprising:
    a polyol;
    an isocyanate;
    a blowing agent;
    a first phosphite ester, the first phosphite ester being reactive with at least one of the polyol and the isocyanate; and
    a second phosphite ester, the second phosphite ester being substantially non-reactive with each of the polyol, the isocyanate, and the first phosphite ester,
    wherein the polyurethane foam is resistant to discoloration from oxides and resistant to scorch;
    wherein the formulation further comprises a surfactant, and the polyurethane foam is an open cell foam;
    wherein the total weight percentage of the first and second phosphite esters combined in the formulation is up to about 15%; and
    wherein the first phosphite ester is present in an amount of at least about 5 parts per hundred parts polyol, and the second phosphite ester is present in an amount of at least 5 parts per hundred parts polyol.

2. The polyurethane foam of claim 1, wherein the isocyanate comprises an aromatic group.

3. The polyurethane foam of claim 1, wherein the polyol comprises a polyether.

4. The polyurethane foam of claim 1, wherein the first phosphite ester comprises at least one instance of a functional group selected from the group consisting of a hydroxyl, an amino, a carboxyl, a thiol, and an amido.

5. The polyurethane foam of claim 1, wherein the first phosphite ester comprises at least one instance of a hydroxyl functional group.

6. The polyurethane foam of claim 5, wherein the first phosphite ester comprises tris(dipropyleneglycol)phosphite.

7. The polyurethane foam of claim 1, wherein the second phosphite ester comprises an aryl-alkyl compound.

8. The polyurethane foam of claim 1, wherein the second phosphite ester comprises poly(dipropyleneglycol)phenyl phosphite.

9. The polyurethane foam of claim 1, wherein the total weight percentage of the first phosphite ester and the second phosphite ester combined is at least about 10%.

10. The polyurethane foam of claim 9, wherein the total weight percentage of the first phosphite ester and the second phosphite ester combined is at least about 15%.

11. The polyurethane foam of claim 1, wherein the foam is sufficiently open cell so as to have an air permeability of at least 0.5 cfm.

12. The polyurethane foam of claim 11, wherein the foam is sufficiently open cell so as to have an air permeability of at least 1.0 cfm.

13. The polyurethane foam of claim 12, wherein the foam is sufficiently open cell so as to have an air permeability of about 1.5 cfm.

14. The polyurethane foam of claim 1, wherein the foam is resistant to discoloration from oxides so as to measure at least 3 on a grey scale as defined by ISO 105-A03 when tested for discoloration in accordance with AATCC 23-2005.

15. The polyurethane foam of claim 14, wherein the foam is resistant to discoloration from oxides so as to measure at least 4 on a grey scale as defined by ISO 105-A03 when tested for discoloration in accordance with AATCC 23-2005.

16. The polyurethane foam of claim 1, wherein the foam is resistant to scorch so as to measure at least 3.5 on a grey scale as defined by ISO 105-A03 when tested for scorch resistance in a microwave scorch test.

17. The polyurethane foam of claim 1, wherein the foam has a density within a range of about 1.20 to about 3.50 pounds per cubic foot.

18. The polyurethane foam of claim 1, wherein the foam has a tensile strength within a range of about 15.00 to about 30.00 pounds per square inch.

19. The polyurethane foam of claim 1, wherein the foam has a percentage elongation at break within a range of about 150% to about 300%.

20. The polyurethane foam of claim 1, wherein the foam has a tear strength within a range of from about 1.50 to about 4.00 pounds per inch.

21. The polyurethane foam of claim 1, wherein the foam has a compression force deflection within a range of about 0.25 to about 0.75 pounds per square inch at a 25% deflection.

22. The polyurethane foam of claim 1, wherein the foam has a compression set of less than about 10.00% when compressed by 50%.

23. The polyurethane foam of claim 1, wherein the formulation further comprises a catalyst.

24. A polyurethane foam produced from a formulation comprising:
    a polyether polyol;
    an aromatic diisocyanate;
    a blowing agent;
    about 5% by weight tris(dipropyleneglycol)phosphite; and
    about 10% by weight poly(dipropyleneglycol)phenyl phosphite;
    wherein the foam is sufficiently open cell so as to have an air permeability of about 1.5 cfm, the foam is resistant to discoloration from oxides, and the foam is resistant to scorch.

25. A polyurethane composition produced from a formulation comprising:

a polyol;

an isocyanate;

a first phosphite ester, the first phosphite ester being reactive with at least one of the polyol and the isocyanate; and a second phosphite ester, the second phosphite ester being substantially non-reactive with each of the polyol, the isocyanate, and the first phosphite ester;

wherein the polyurethane composition is resistant to discoloration from oxides and resistant to scorch;

wherein the first phosphite ester comprises tris(dipropyleneglycol)phosphite;

wherein the second phosphite ester comprises poly(dipropyleneglycol)phenyl phosphite;

wherein the total weight percentage of the first and second phosphite esters combined in the formulation is up to about 15%; and wherein the first phosphite ester is present in an amount of at least about 5 parts per hundred parts polyol, and the second phosphite ester is present in an amount of at least 5 parts per hundred parts polyol and up to 10 parts per hundred parts polyol.

26. The polyurethane composition of claim 25, wherein the isocyanate comprises an aromatic group.

27. The polyurethane composition of claim 26, wherein the isocyanate comprises toluene diisocyanate.

28. The polyurethane composition of claim 25, wherein the polyol comprises a polyether.

29. The polyurethane composition of claim 25, wherein the total weight percentage of the first phosphite ester and the second phosphite ester is about 15%.

30. The polyurethane composition of claim 25, wherein the polyurethane composition is a foam.

31. The polyurethane foam of claim 1, wherein the first phosphite ester comprises tris(dipropyleneglycol)phosphite, and the second phosphite ester comprises poly(dipropyleneglycol)phenyl phosphite.

32. The polyurethane foam of claim 1, wherein the first phosphite ester comprises tris(dipropyleneglycol) phosphite in an amount of about 5 parts per hundred parts polyol; and the second phosphite ester comprises poly(dipropyleneglycol)phenyl phosphite in an amount of about 10 parts per hundred parts polyol.

33. The polyurethane composition of claim 25, wherein the tris(dipropyleneglycol)phosphite is present in an amount of about 5 parts per hundred parts polyol; and the poly(dipropyleneglycol)phenyl phosphite is present in an amount of about 10 parts per hundred parts polyol.

\* \* \* \* \*